US011083144B2

(12) United States Patent
Proulx et al.

(10) Patent No.: US 11,083,144 B2
(45) Date of Patent: Aug. 10, 2021

(54) PLANT CONTAINER AND TRAY SYSTEM

(71) Applicant: SYNGENTA PARTICIPATIONS AG, Basel (CH)

(72) Inventors: Timothy Proulx, Palo Alto, CA (US); Ari Tao Adler, Palo Alto, CA (US); Matthew Patrick Brown, Palo Alto, CA (US); Cindy Ellen Wieland, Greensboro, NC (US); Gerardo Joaquin Suazo, Greensboro, NC (US); Alexander Prohodski, Gilroy, CA (US)

(73) Assignee: Syngenta Participations AG, Basel (CH)

( * ) Notice: Subject to any disclaimer, the term of this patent is extended or adjusted under 35 U.S.C. 154(b) by 62 days.

(21) Appl. No.: 15/767,367

(22) PCT Filed: Oct. 31, 2016

(86) PCT No.: PCT/EP2016/076253
§ 371 (c)(1),
(2) Date: Apr. 11, 2018

(87) PCT Pub. No.: WO2017/072365
PCT Pub. Date: May 4, 2017

(65) Prior Publication Data
US 2018/0303040 A1 Oct. 25, 2018

Related U.S. Application Data

(60) Provisional application No. 62/248,731, filed on Oct. 30, 2015.

(51) Int. Cl.
*A01G 9/02* (2018.01)
*A01G 9/04* (2006.01)
*A01G 9/029* (2018.01)

(52) U.S. Cl.
CPC ........... *A01G 9/027* (2013.01); *A01G 9/0297* (2018.02); *A01G 9/045* (2013.01)

(58) Field of Classification Search
CPC ...... A01G 9/027; A01G 9/0297; A01G 9/045; A01G 9/042; A47H 27/00
See application file for complete search history.

(56) References Cited

U.S. PATENT DOCUMENTS 4,559,738 A 12/1985 Helfman
4,887,388 A * 12/1989 Waltel, Jr. .............. A01G 25/02
47/79

(Continued)

FOREIGN PATENT DOCUMENTS

CA 2238914 A1 11/1999
GB 2263052 A 7/1993

OTHER PUBLICATIONS

International Search Report for International Patent Application No. PCT/EP2016/076253 dated Feb. 8, 2017.

*Primary Examiner* — Trinh T Nguyen
(74) *Attorney, Agent, or Firm* — Dale Skalla

(57) ABSTRACT

There is provided by the present invention planting containers and associated trays for the production, distribution and display of plants where the planting containers have a channel in the base for engaging with a production or display tray for positioning plant pots in a desired orientation. In one embodiment, the plant container is a flower pot which comprises an upper part; a middle part connected at one end to the upper part; and a bottom part connected to an opposite end of the middle part; the bottom part having a channel extending from one side of the bottom part to the other side of the bottom part; said channel having an apex perpendicu- (Continued)

lar to an axis of the pot, first and second sides, and a plurality of slots at the apex for engaging with a rail system on the tray having teeth.

5 Claims, 11 Drawing Sheets

(56) References Cited

U.S. PATENT DOCUMENTS

| | | | | |
|---|---|---|---|---|
| 5,022,183 | A | * | 6/1991 | Bohlmann .............. A01G 9/045 |
| | | | | 206/423 |
| 5,327,679 | A | | 7/1994 | Hawthorne |
| 7,454,864 | B2 | * | 11/2008 | Smith ....................... A01G 9/02 |
| | | | | 47/87 |
| 2012/0066970 | A1 | * | 3/2012 | Contillo, III ........... A01G 9/045 |
| | | | | 47/66.6 |
| 2012/0137581 | A1 | * | 6/2012 | Teasdale ................ A01G 31/02 |
| | | | | 47/66.6 |
| 2014/0230324 | A1 | | 8/2014 | Harooni |
| 2015/0166517 | A1 | * | 6/2015 | Atwood ............... C07D 403/04 |
| | | | | 514/266.24 |
| 2018/0064041 | A1 | * | 3/2018 | Brigham .............. A01G 27/005 |
| 2018/0263193 | A1 | * | 9/2018 | Diller ..................... A01G 9/027 |

* cited by examiner

PLANT CONTAINER AND TRAY SYSTEM

FIELD OF THE INVENTION

This invention relates generally to planting containers and associated trays for the production, distribution and display of plants. More specifically, the present invention relates to planting containers having a channel in the base for engaging with a production or display tray for positioning plant pots in a desired orientation and also providing increased inner surface area for root systems.

BACKGROUND OF THE INVENTION

Plant containers and associated trays having multiple locations in which pots may be retained are used in the horticultural industry for simultaneously holding and transporting multiple plant pots, including pots for flowering and non-flowering plants. All manner of sizes of pots are employed by growers, wholesalers and/or retailers in the growing, distribution and retail display of such plants, including based on the type and/or size of plant contained therein. As such, in practice a multitude of different pots and associated trays are utilized in order to accommodate the varying practices that are used in industry.

WO2004095905 discloses planting pots for use with a multi-compartment tray, where the pots and tray having a self-orienting configuration. The pots include angled recesses disposed radially about the bottom portion of the pots which engage with corresponding angled protrusions of the compartment. However, this system only allows for a fixed number of pots and limited configurations.

In addition, various pot configurations have been developed to facilitate that the roots of the plants grown in the pot do not become root bound such as by girding or circling around the inner pot and thus minimize need for disturbance at the time of planting to reduce transplant shock.

JP2003299414A provides a seedling pot is composed of a side wall and a bottom where the bottom is formed in a conical form protruding toward the opening of the side wall and has a number of small holes or a net. There is no disclosure regarding engagement with a production or display tray for positioning such plant pots in any desired orientation.

GB191227744 discloses a flower pot having an external receptacle in the form of an inverted truncated cone which has on or more perforated tubes that extend upwards toward the upper edge of the receptacle. Although designed specifically for orchids, it is reported that roots growth is promoted when they grow between the aeration surfaces provided by the tubes. As with JP2003299414A, there is no disclosure regarding engagement with a production or display tray for positioning such plant pots in any desired orientation.

SUMMARY OF INVENTION

The present invention represents planting containers and associated tray components that can be used independently or together for the production, distribution and display of plants. The present invention provides versatility as a new setup of production methodology and retail display, and has the ability to integrate into consumer home use solutions. With this present invention, new pot count and spacing configurations are also possible, resulting in ideal plant health and production efficiency. Further, an integrated tag is provided which improves consumer utility and garden performance.

The present invention relates to an improved flower pot and tray system having rails which engage such pots. While this invention will be sometimes referred to herein as a "flower" pot and tray system, it will be understood that the container, tray and combined system is intended for use with multiple types of ornamental or crop plants.

In one embodiment, the flower pot of the invention comprises an upper part; a middle part connected at one end to the upper part; and a bottom part connected to an opposite end of the middle part; the bottom part having a channel extending from one side of the bottom part to the other side of the bottom part; said channel having an apex perpendicular to an axis of the pot, first and second sides, and a plurality of slots at the apex for engaging with a rail system on the tray having teeth.

The channel or the flower pot can have various configurations including, for example, a tulip-like, a U-like or a funnel-like configuration.

The tray and rail system of the invention typically has a plurality of teeth for engaging with the slots of the pots in order to hold such pots into a desired position. Typically, the rails can carry one or more pots and the trays have at least two rails.

BRIEF DESCRIPTION OF THE DRAWINGS

These and other important objects and features of the invention will be apparent from the following detailed description of the invention, taken in connection with the accompanying drawings.

DETAILED DESCRIPTION OF INVENTION

The flower pot 10 of the invention has a channel 12 on the bottom part 14 which allows an integrated fit with a tray having a rail system. The channel 12 has a top, or apex 118 which extends from one side to the other in a line B which is perpendicular to an axis A of the pot The pot 10 shape is designed so that it provides the plant roots with increased inner surface area to help root development. The shape is also configured to allow drainage through the pot, as well promote optimal root establishment shape with a view toward reducing transplant issues.

Figures 23, 24, 25:
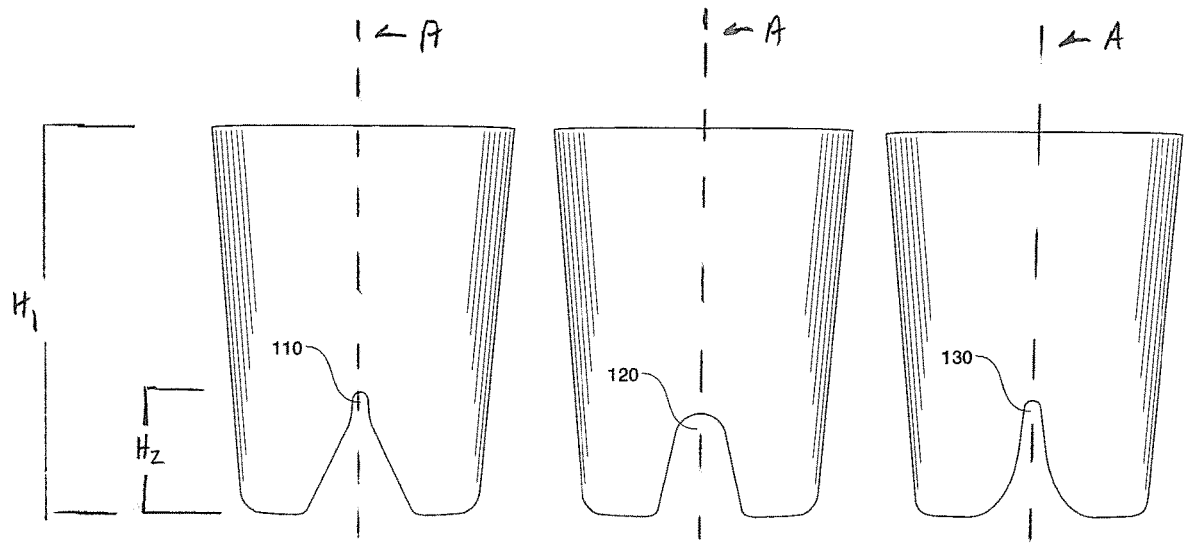
FIG. 23 shows an example of a channel configuration with a funnel-like shape.
FIG. 24 shows an example of channel configuration with a U-like shape.
FIG. 25 shows an example of channel configuration tulip-like shape.

In one embodiment, the pot 10 has a channel 12 with a tulip-like shape (see, e.g., FIG. 25). Other shapes are also possible within the scope of the invention.

In one embodiment, a pot 10 with a channel 12 having tulip-like shape (FIG. 25) of the present invention is selected to influence flower crop finishing times and reduce root stress (e.g., less circling, girdling or single impacted root ball) compared to conventional plant pots upon transplant. For example, plants that have outgrown their containers may have deformed root systems, which can result in girdling roots or such plants may be root bound in the container. In such case, the root ball of these plants must be torn or cut open to reduce water uptake deficiency and/or subsequent circling or girdling roots which can increase transplant stress. Another advantage of the pot shape is that it creates the required functionality, but with minimal loss of soil volume in the pot.

In one embodiment, the specific volume of the pot is not particularly important, but rather the ratio of the volume of the channel on the bottom of the pot compared to the volume of the rest of the pot.

In another embodiment, the height of the channel 12 ($H_2$) is about ⅓ of the height of the pot 10 ($H_1$.)

The pot 10 of the invention is typically comprised of tensile, thermoplastic material.

In one embodiment, the pot 10 is comprised of polypropylene. In another embodiment, the pot is comprised of biodegradable materials such as biodegradable thermoplastics.

The channel 12 located on the bottom 14 of the pot typically has a plurality of slots 24 on its uppermost part or apex 118. These slots 24 serve to engage with teeth 68 positioned on the rail 60 of the tray 64 as part of an integrated production, distribution and/or display system.

In one embodiment, there are three slots 24 on the apex 118 (uppermost part of the channel 12) which are equally spaced apart. In another embodiment, the three slots 24 will only engage with two teeth 68 on the rail 60, leaving one slot of the plurality of slots 24 empty at any given time. In this embodiment, the distance separating the first and third slot 24 of the pot 10 is the same as that separating two teeth 68 adjacent to one another on the rail.

The slotted pot and rail tray system of the present invention offers determinant spacing regardless of configuration to offer consistency in growing and presentation for positioning plant pots in a desired orientation. In other words, spacing can be changed but it remains consistent. This is accomplished by the slots and the teeth.

The pot 10 of the invention typically has a tear-off tab 30. This allows for easier removal of a plant without having to turn the pot upside down and shaking it. The act of removing the tear-off tab 30 creates an opening 50 and releases the tension around the plant. The tear-off tab is built in thereby reducing costs as well as helping to prevent the tab falling off the pot. The unidirectional channel 12 enables the user to "pinch" the base of the plant thereby easing removal of plant from pot.

The tear-off tab 30 is designed with specific plastic and perforation gradation or scoring.

In one embodiment, the tab 30 or alternatively 150 (FIG. 27), has small nicks or notches at the upper end of the pot to assist in the tear off process. The tear-off tab material is typically designed to enable ability to tear with or without the label. The plastic type, grading and flow speed through the mold is critical to enable uniformity.

The flower pot 10 and associated tray 64 taken as system of the present invention also lends itself well to branding. The low profile tray in particular enhances the area available for this purpose.

In one embodiment, the brand labelling is applied using IML (in mold labelling). This method employs molten and durable plastic material and is commonly used on food product packaging such as butter containers.

In one embodiment, the label (see FIG. 22) is applied to the mold on the cavity side of the tool. When plastic is injected in to the mold, it binds with the label. In one embodiment, an integrated in-mold label is specifically aligned with the pot design and tear-off tab with perforated label at tear-off tab position.

The material for the tray 64 should preferably have high tensile strength. In one embodiment, the tray comprises high density polypropylene. Where an ethylene material is used for the label, this has been found to bond well with polypropylene. In another embodiment, the tray comprises biodegradable materials.

The tray 64 can be designed to get the most strength for the least amount of plastic used. In one embodiment, the tray comprises a series of cut out holes (e.g. FIGS. 18 and 21). This reduces plastic usage whilst still maintaining the tensile strength of the tray.

The plurality of slots 24 on the apex 12 of the channel serve to engage with a plurality of teeth 68 on a rail 60 of tray 64. In one embodiment, the plurality of teeth 68 serve as indexing features that are used to locate the pot on the rail. In another embodiment, the pot can be permanently locked on to the rail.

In a particular embodiment, the tray comprises a plurality of substantially parallel positioned rails attached to a frame.

In one embodiment, the teeth on the rail are movable. This arrangement potentially allows the use of different sized pots on the same tray. In one embodiment, the teeth can be pushed into the rail so that they are no longer able to engage with the slots of the pot.

In one embodiment, the rails are in a raised position relative to the ground so as to improve air flow. In this arrangement, air is allowed to enter underneath the system can get up and around the pots.

The benefits of having this raised position can be seen especially in humid or wet conditions. The increased air flow reduces incidence of disease. If the floor or ground is wet then there is reduced chance of pathogen infection.

The system design therefore allows pots to be kept off the floor but still provides access to water via various sub-irrigation systems. The positioning of water holes in bottom of pot can be aligned with the water source to enable optimum uptake.

In one embodiment, the raised position is made possible due to the presence of feet 68 on the bottom of the tray. These feet can be rounded to also permit easy sliding of the system across tables and benches.

Rail rigidity is an important feature of the system of the invention. The rails provide structural integrity to the tray system and prevents bending and folding of the frame when the user carries it.

In one embodiment, the tray 64 has a hexagonal honeycomb like pattern. This allows dirt to pass through when the tray system is on a soil filling line commonly used in plant production. Such filling lines typically use a hopper from which soil drops down onto the pots to be filled. Prior art systems require the user to brush excess soil off the surface. The hexagonal pattern does not usually require this because it allows soil and dirt simply to fall through during processing.

The hexagonal pattern also enables better airflow through the system compared with a conventional mesh found in prior art systems. This has added health benefits for the plant. It also imparts an increased sturdiness and robustness to the system of the present invention.

Another advantage of the design of tray 64 in this embodiment (see FIGS. 18 and 21) is that the ribs on the edge are thicker towards the bottom. This ergonomic design makes it easier for the user to lift using their fingers.

Pot spacing is also an important consideration for the user of the system. In one embodiment, the pot is able to fit in the central section between the rails. In one embodiment, when there is a pot positioned on the rails, it is not possible to place a pot between the rails.

Leaving enough space for the plants will promote good air circulation and plant growth, especially for larger plants to give them enough room to grow. One advantage of positioning the pots between the rails is that they are held like they would be in a tray with surrounding walls.

The system of the invention allows the user to employ a checker boarding arrangement of plants with alternate spacing. This arrangement promotes better plant growth.

Varying the position of the rails enables different pot sizes and tray sizes to be designed to provide new consumer displays which utilize similar arched designs and integrated rail systems.

A single tray with multiple configurations can be envisaged. For example, a 5 pot, 7 pot, 8 pot, or 10 pot arrangement for retail display or greenhouse production enables more cost effective options for production.

Another important feature of the system of the invention is the stability of the pots when attached to the rail. The teeth bite into the underbelly of pot via the slots, thereby preventing the pots from sliding off the rail. The advantage of the teeth and slot arrangement is that they give a clear locating effect on the tray as well.

It has been observed that when the system of the present invention is held at a 45 degree angle, the pots are gripped effectively and do not fall off. Added stability is obtained especially when the system is full of pots. In one embodiment, the tray has a lip at the edge to provide even better pot stability.

For retail, the system of the present invention only typically allows the pot 10 to be oriented on the tray 64 in two ways. This reduces the number of permutations and variations so gives more flexibility on labelling graphics. Crucially, it means that there is no need to put graphics on all sides of the pots, thereby reducing labelling costs.

The pot can only go onto the tray in one of two ways so it allow better control of the graphics and branding at the point of sale.

In a retail setting, the system can be arranged on a table for viewing. The use of a tab system in the rail enables the user to change pot configurations in the tray. The possibility exists to develop a universal rail system and design new pot configurations for retail or consumer displays, including alignment with irrigation systems.

In an alternative embodiment, a rail system having no protruding teeth can be envisaged. In this embodiment, the pots are held by a friction fit or interference fit.

The pot and the trays of the system of the invention lend themselves well to stacking. Even though the rail has height, it is still easy to stack the trays thus reducing environmental footprint. The design makes it easy for the user to pull trays and pots out the box, when compared with prior art pots and trays.

Figure 26:
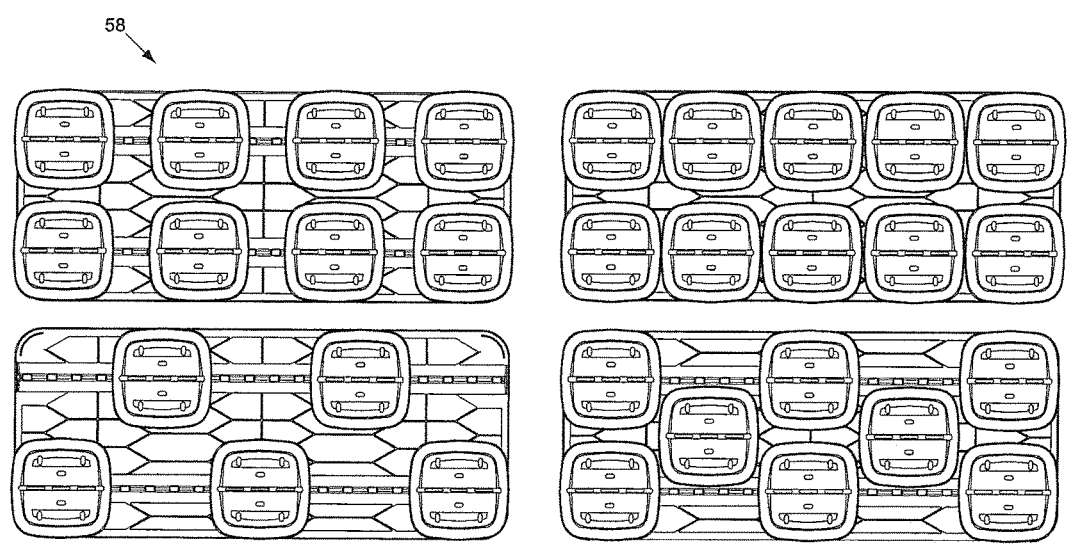
FIG. 26 shows a top view of a pot and associated tray system of the invention in four different display configurations.

For production, the system of the present invention allows multiple pot configurations to be utilized as shown, for example, in FIG. 26; for example, up to seven configurations are possible with 950 ml pots. See also FIGS. 10 to 16.

Figure 1:
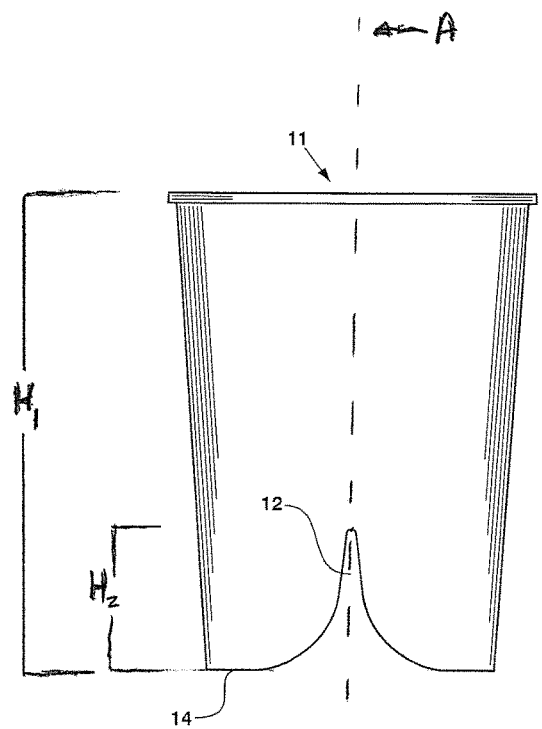
FIG. 1 is a side view of a flower pot of the invention having a channel defined by an axis, and an apex.

Referring now more specifically to the drawings, FIG. 1 is a side view of a flower pot 10 having a substantially square open top 11 and a channel 12 on the bottom 14 of the flower pot. The area defined by the channel can be calculated and expressed as a ratio to the total volume of the pot. The shape of the channel is typically matching the shape of the corresponding rail with which it engages. The width of the pot is typically narrower at the bottom compared with the top.

Figure 2:
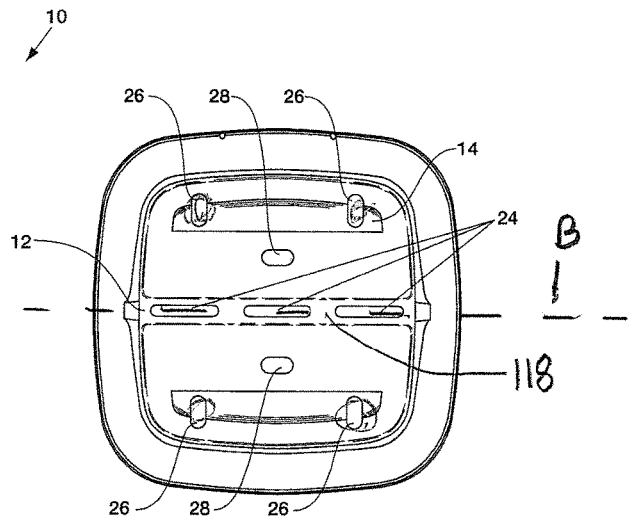
FIG. 2 shows a bottom view of the flower pot having three slots on the channel and four outer holes arranged in the outer corners of the bottom of the pot in a square configuration and two inner holes arranged on the bottom to allow free movement of water or dirt through the pot.

FIG. 2 shows a bottom view of the flower pot 10 having three slots 24 on the uppermost part of channel 12 and four outer holes 26 arranged in the outer corners of bottom 14 in a square configuration and two inner holes 28 arranged on the bottom 14 to allow free movement of water or dirt through the pot. When the pot is engaged with the rail, it is typical that only two out of three of the slots are in use. This is due to the slots of the pot and the teeth on the rail being spaced apart different distances. The outer and inner holes are cut out of the bottom of the pot and are designed to allow the free drainage of water. In some embodiments, these holes may also be used for entry of water into the pot via a sub-irrigation system.

Figure 3:
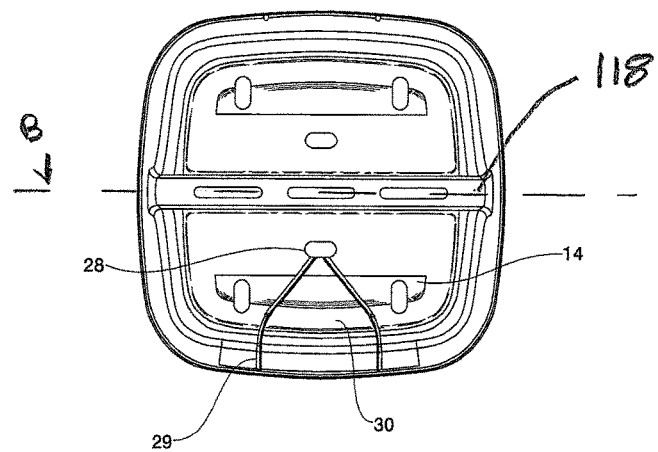
FIG. 3 shows a bottom view of perforations on the tear off tab extending down to one of the inner holes on the bottom of the pot.

FIG. 3 shows a bottom view of perforations 29 on tear off tab 30 extending down to one of the inner holes 28 on the bottom 14.

Figures 4, 5, 6:
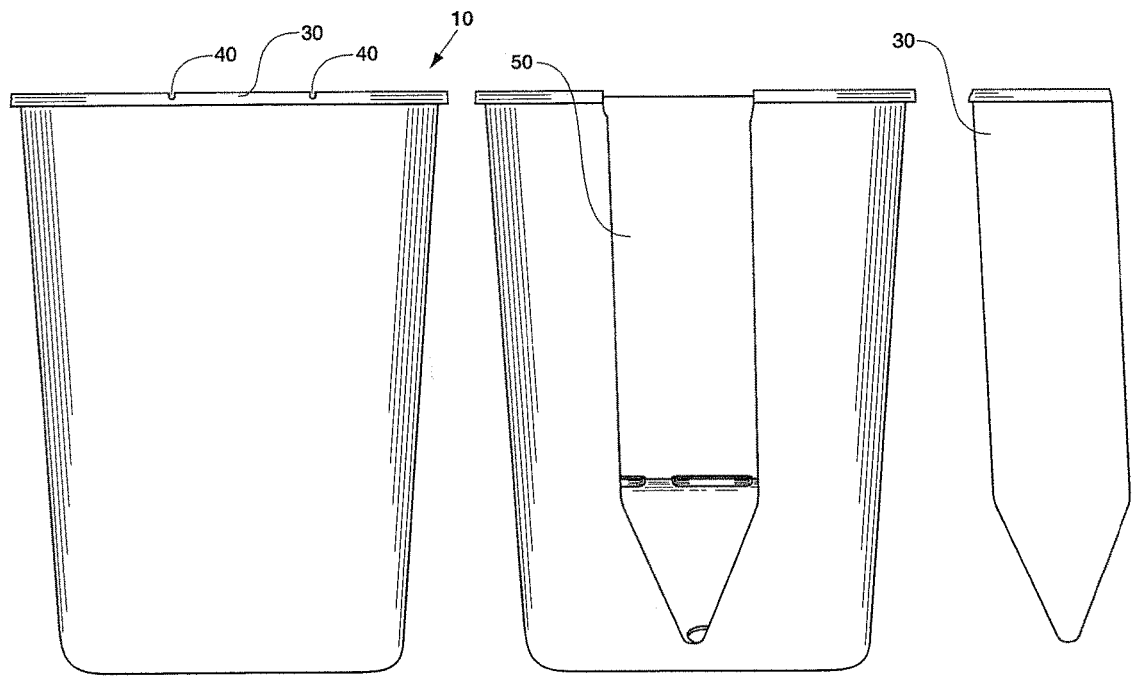
FIG. 4 shows a side view of the flower pot with nicks present on the top of the flower pot which are present to allow the user to easily tear off the tab.
FIG. 5 shows a side view of the flower pot 10 with a hole in the side of the flower pot which is formed by the removal of the tear off tab.
FIG. 6 shows the tear off tab removed from the side of the flower pot.

FIG. 4 shows a side view of pot 10 with nicks 40 present on the top of the pot which are present to allow the user to easily tear off tab 30.

FIG. 5 shows a side view of the pot with a hole 50 in the side of the pot which is formed by the removal of tear off tab. Removal of the tab makes it easier for the user to remove the plant from the pot and avoids the need for turning the pot upside down and resulting soil spillage.

FIG. 6 shows tear off tab 30 removed from the side of the pot.

Figures 7, 8:
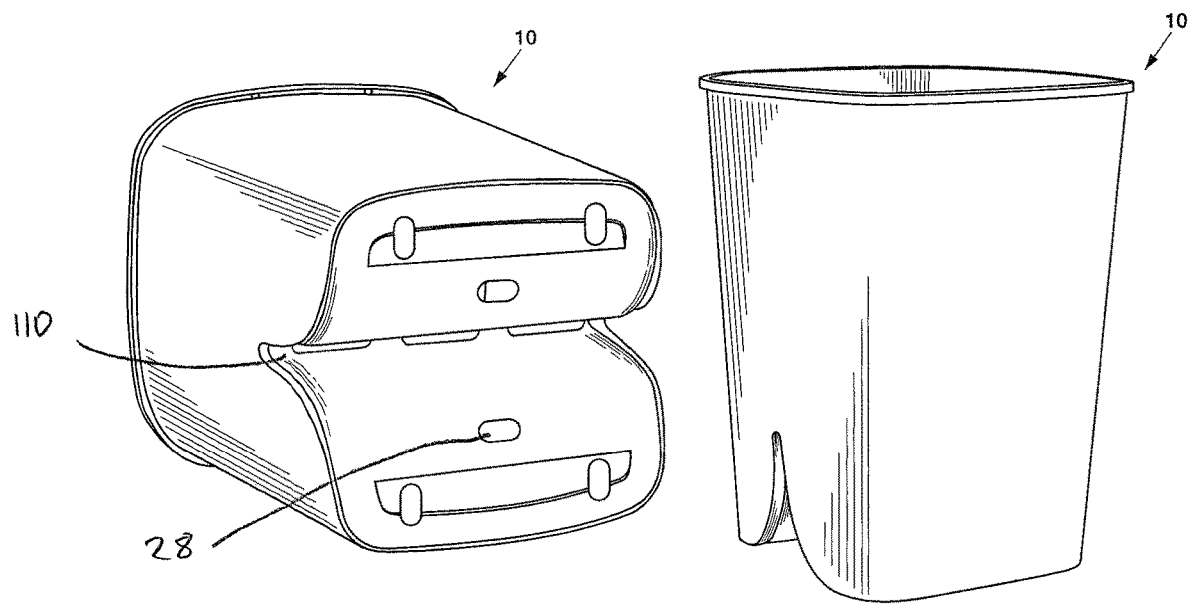
FIG. 7 shows a perspective view of flower pot in a horizontal position.
FIG. 8 shows a perspective view of flower pot in an upright position.

FIG. 7 shows a perspective view of pot 10 in a horizontal position.

FIG. 8 shows a perspective view of pot 10 in an upright position.

Figure 9:
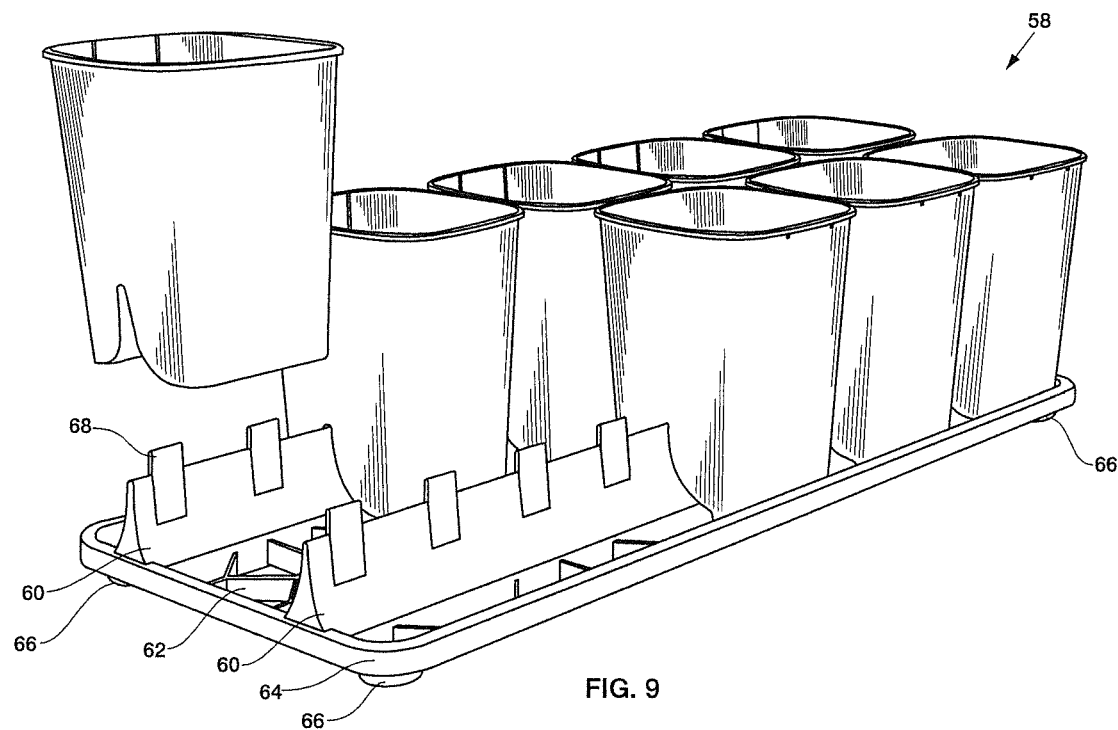
FIG. 9 shows a system of the invention having a plurality of flower pots arranged on a plurality of rails in a parallel arrangement and separated by a honey comb mesh arrangement, said rails being attached to a rectangular tray frame with feet and having a plurality of teeth arranged on the rail designed to engage with slots on the channel, thereby holding the flower pots in position and prevent them sliding along the rails.
Figure 10:
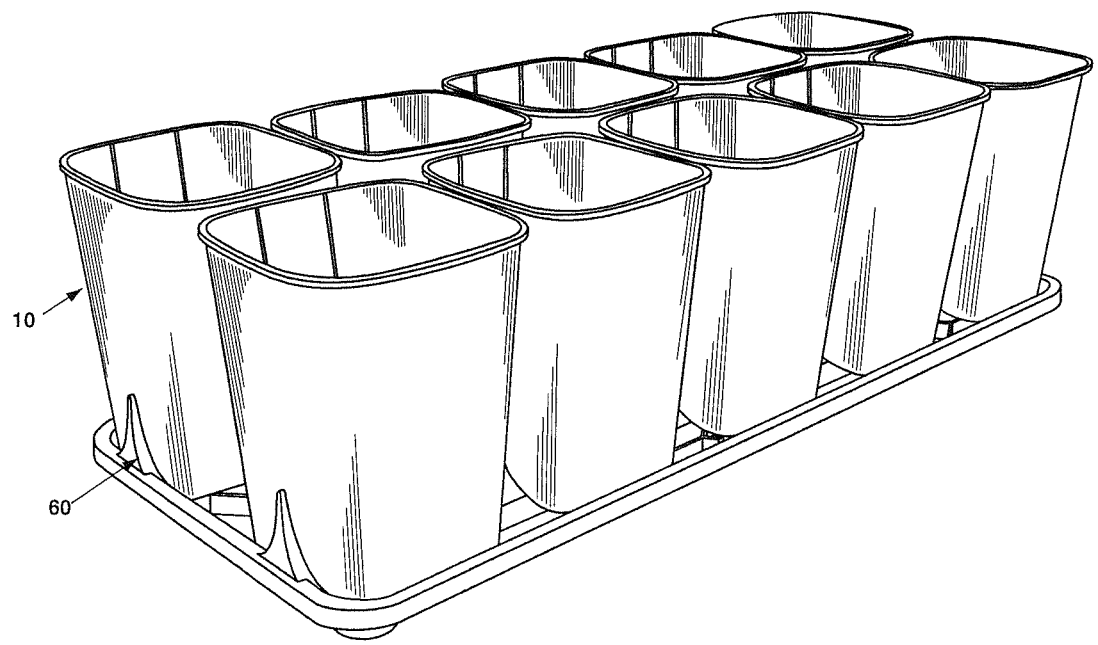
FIGS. 10 to 16 show a perspective view of the various arrangements of the flower pot on the rail.
Figure 11:
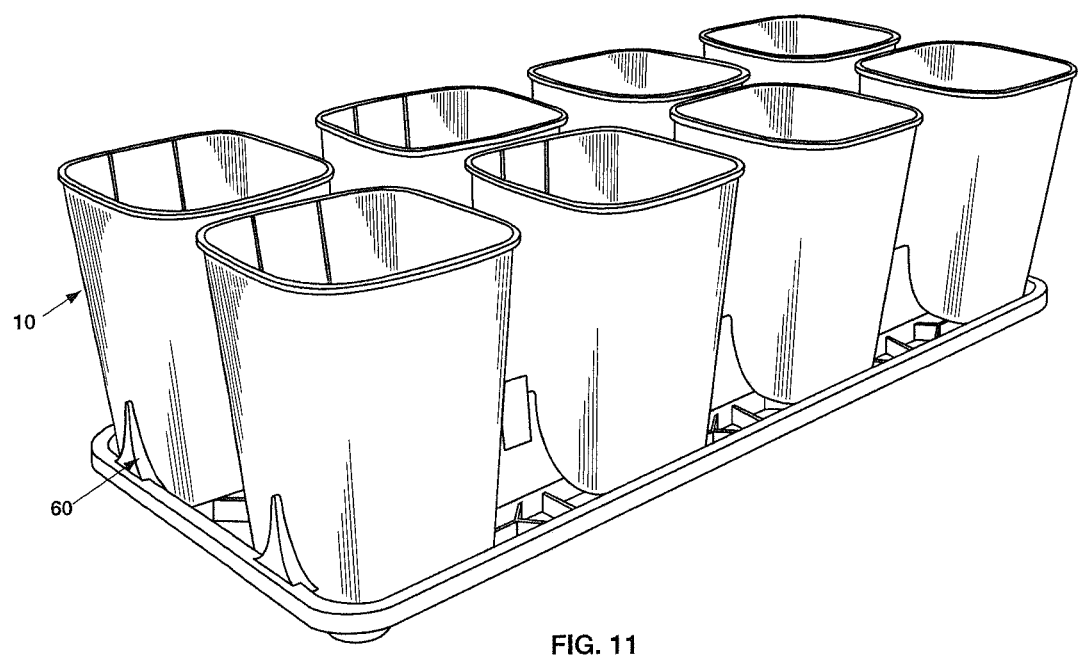
Figure 12:
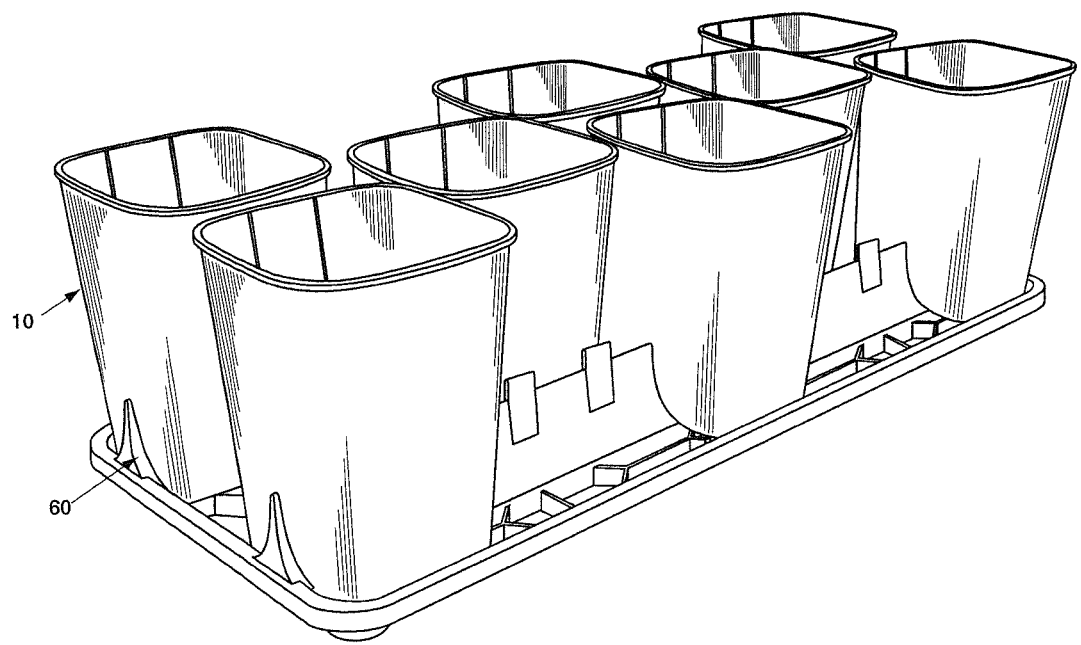
Figure 13:
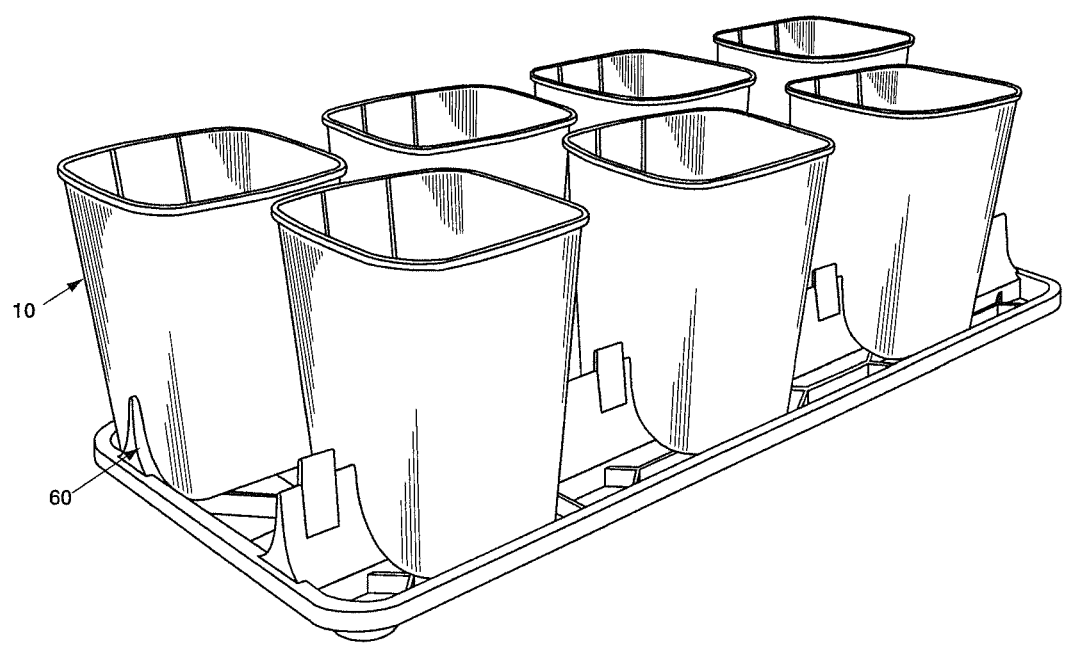
Figure 14:
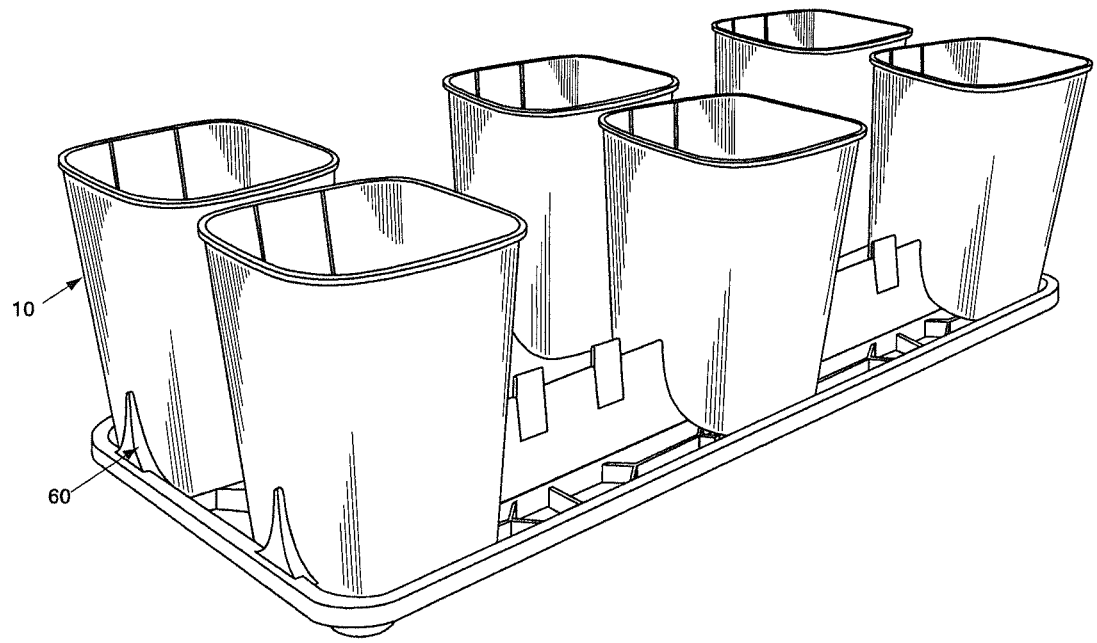
Figure 15:
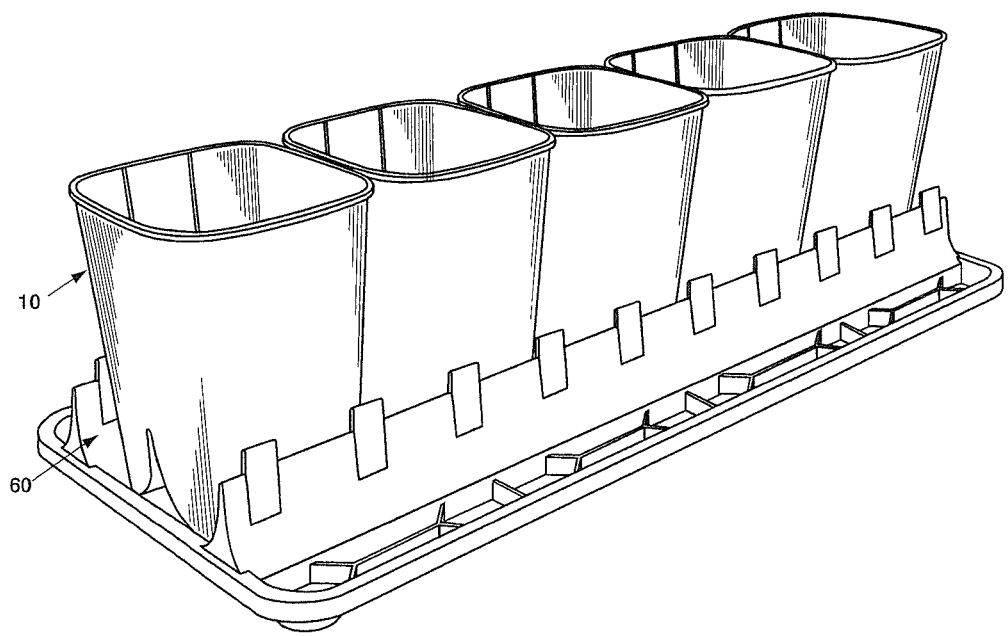
Figure 16:
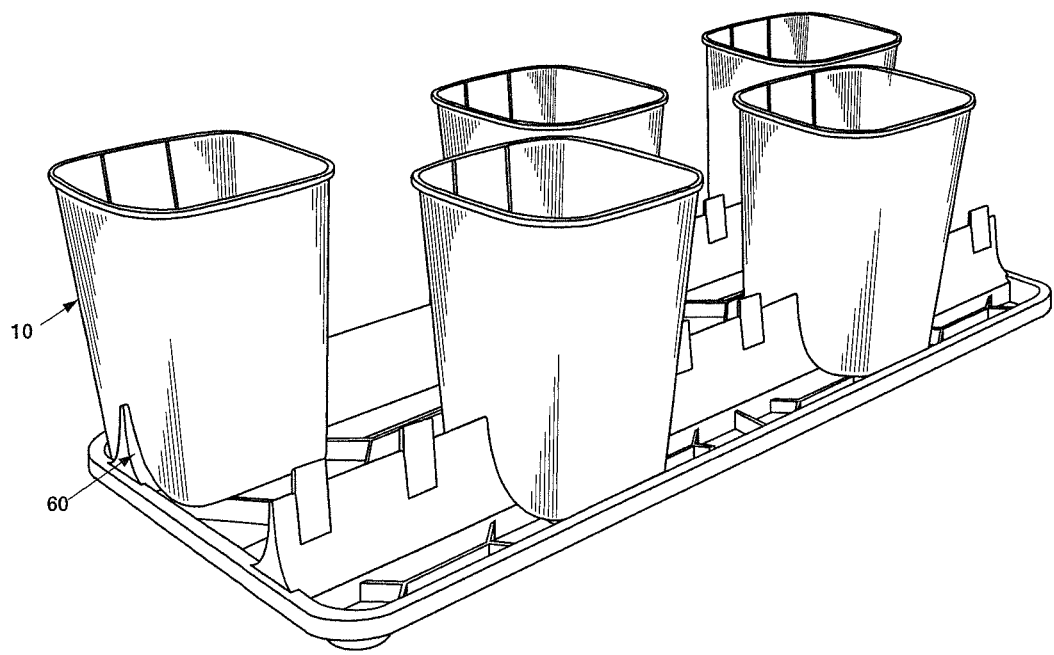

FIG. 9 shows a system of the invention 58 having a plurality of pots arranged on a plurality of rails 60 in a parallel arrangement and separated by a honey comb mesh arrangement 62, said rails being attached to a rectangular tray frame 64 with feet 66 and having a plurality of teeth 68 arranged on the rail designed to engage with slots 24, thereby holding the pots in position and prevent them sliding along the rails 60.

FIGS. 10 to 16 show a perspective view of the various arrangements of the pot 10 on the rail 60.

Figure 17:
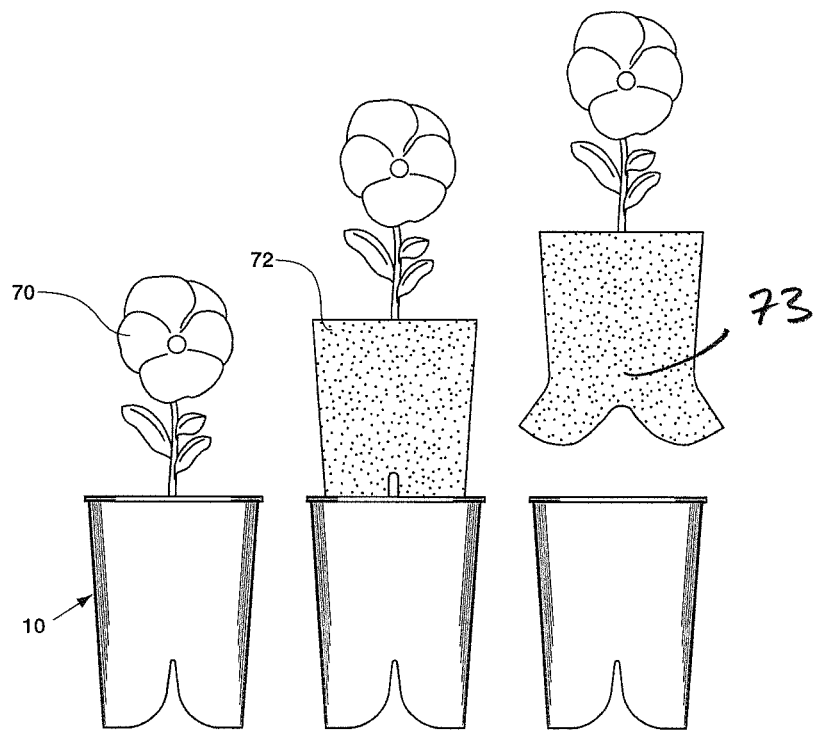
FIG. 17 show a side view of the flower pot having a flower in soil or other suitable growing medium.

FIG. 17 show a side view of pot 10 having a flower 70 in soil or other suitable growing medium 72 and shows a bisected root ball 73 resulting in greater dispersing of roots so the plant needs less water and care for proper establishment, unlike conventional pot shapes which encourage a single, impacted root ball that impedes plant establishment.

Figure 18:
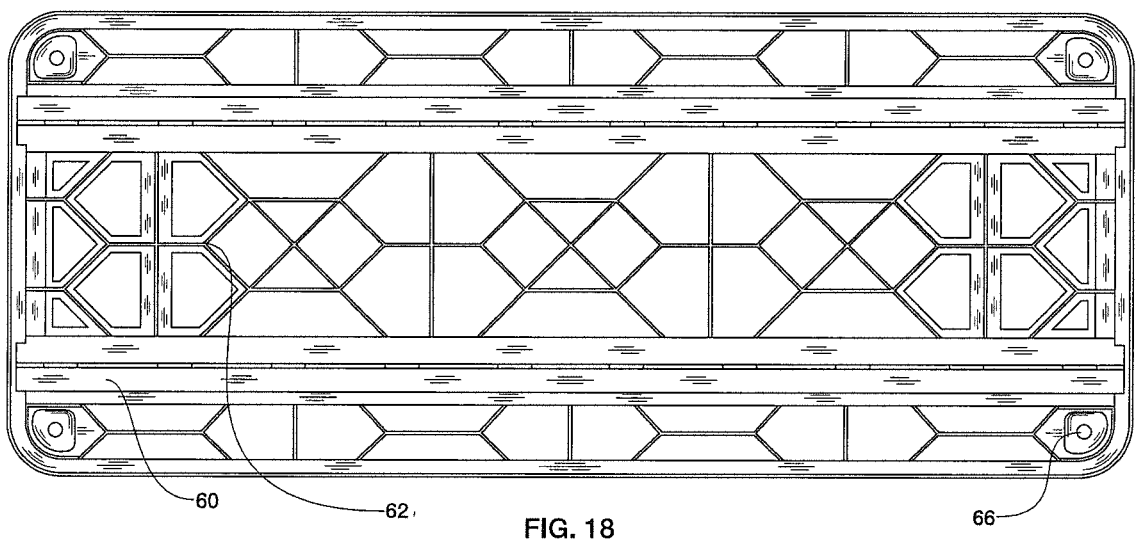
FIG. 18 is a bottom view of a honey comb mesh arrangement, rails, and feet.

FIG. 18 is a bottom view of honey comb mesh arrangement 62, rails 60, and feet 66.

In accordance with one aspect of the invention, the honey-comb like design allows media to fall through tray, eliminating the need to brush excess media off the top of the tray as required with conventional tray designs, providing a cleaner production environment. Also, rounded feet on tray bottom ensure smooth sliding of tray on multiple surfaces including but not limited to concrete and wire mesh absence of interruption for more efficient production, unlike conventional trays which are frequently caught or stopped when sliding attempted across surface.

Figure 19:
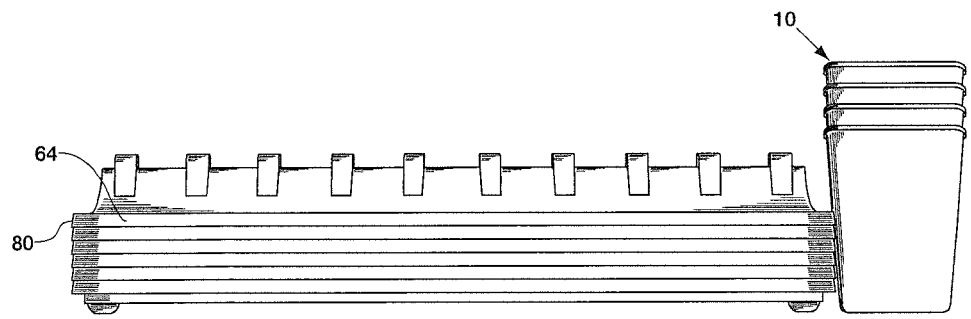
FIG. 19 shows a stacked arrangement of the flower pots and of frames having ribs for easy handling by the user.

FIG. 19 shows a stacked arrangement of pots 10 and of frames 64 having ribs 80 for easy handling by user.

In addition, bevelled bottom tray design ensures stability when stacked for simple staging in production, unlike conventional pot and tray systems which quickly began to compress when stacked. Also, the rounded feet on bottom of tray prevent media compression when trays are stacked, while conventional tray designs cause media compression of 10-20% restricting air flow, negatively impacting plant growth.

Figure 20:
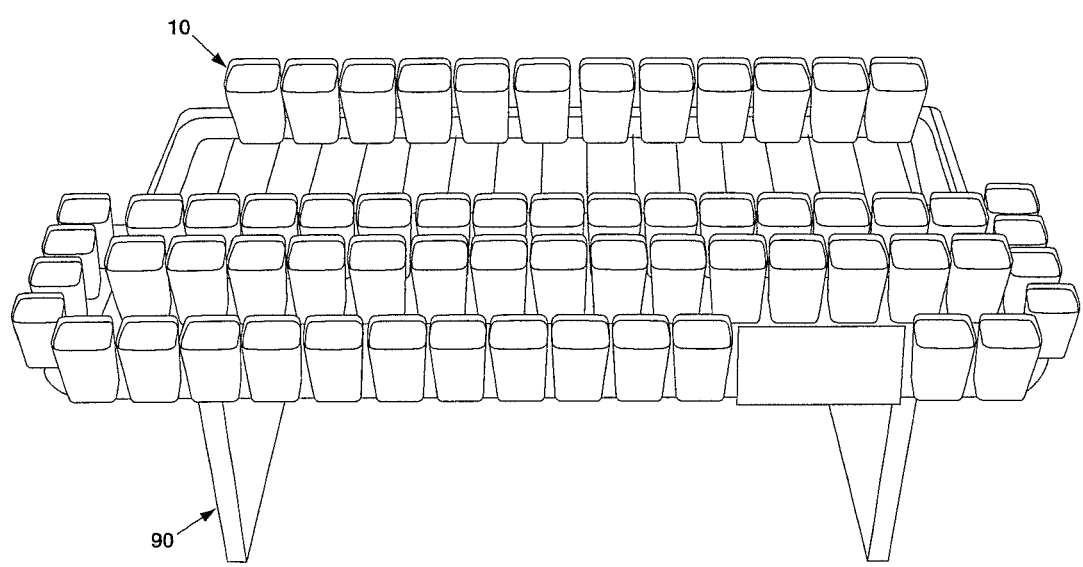
FIG. 20 shows a table with an arrangement of a plurality of flower pots.

FIG. 20 shows a table 90 with an arrangement of a plurality of pots 10.

Figure 21:
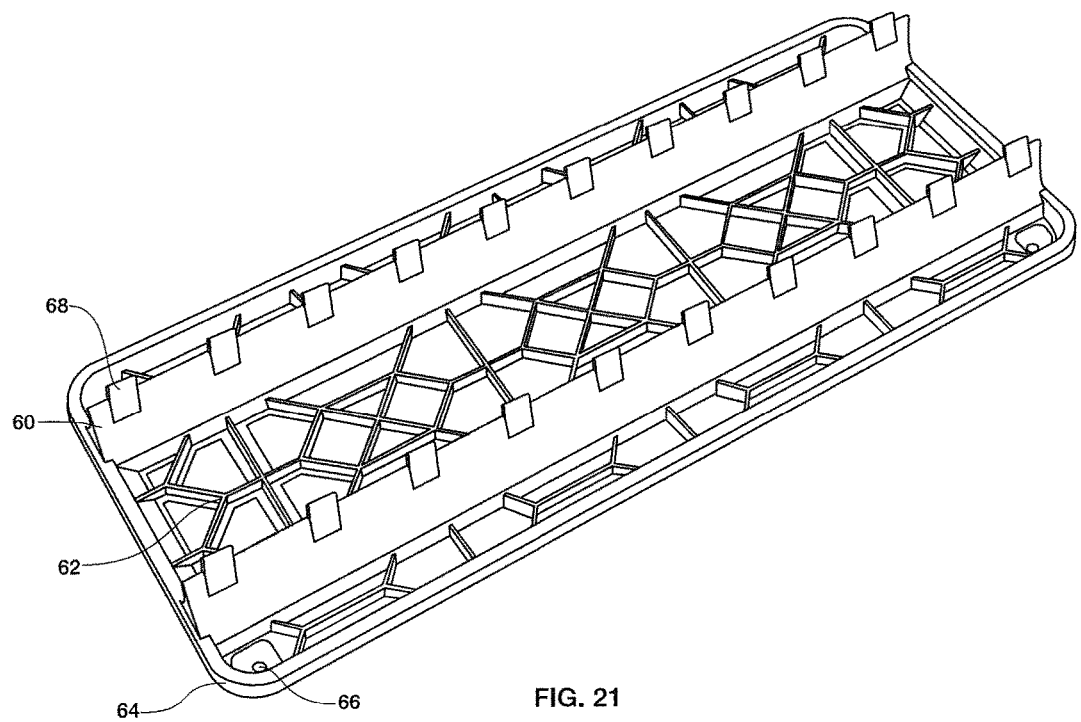
FIG. 21 shows a perspective view of the plurality of the rails separated by a honey comb mesh arrangement, said rails being attached to a rectangular tray frame with feet and having a plurality of teeth.

FIG. 21 shows a perspective view of the plurality of rails 60 having a plurality of teeth 68, said rails separated by a honey comb mesh arrangement 62, and being attached to a rectangular tray frame 64 with feet 66.

In one embodiment, the tray rails elevate pot(s) placed on rail, preventing pots from resting on surface or in water, reducing likelihood of water- or soil-borne disease infestation experienced with conventional trays that force surface contact with pots. Simultaneously, the tray provides access to water source for optimum intake. Tray with rail design consumes less space than conventional trays designed for square or round pots. In one configuration, a space savings of 10-15% was observed.

Furthermore, the tray's structural integrity ensures filled and unfilled pot(s) placed on tray remain connected to tray even when tilted. This flexible construction permits one-handed tray handling and tilting to at least 45° with pot(s) remaining connected and undamaged, unlike conventional designs which require two-handed or machine handling and very little, if any flexibility when tilted, causing 1) pots to disconnect from tray and become damaged and 2) production time loss.

The plurality of teeth on the tray rail permit multiple spacing of pot(s) to customise production where needed for various plants, whereas conventional systems allow for a maximum of 4 spacing configurations. Further, the tray rail position of the present invention also permits multiple merchandising configurations unlike conventional designs which are rigid and present severely limited merchandising options.

Reinforced main rim/perimeter of tray improves user's gripping capability of tray for easier handling of tray, preventing user hazard and reducing fatigue typically experienced with conventional tray handling.

In one embodiment, the tray's low profile main rim/perimeter channel allows 95% visibility of pot(s) placed on tray rail system to maximize branding at point of sale and decrease errors at production, unlike conventional trays which hide pot labels, limiting brand presence for retail users and limiting visibility of product information for both growers and consumers.

Trays used in the system of the invention function as production and merchandising apparatus for optimum value chain efficiency. Durability of tray decreases damage occurrence along value chain from production to point of sale.

The tray's teeth positioning allow two pot orientations to maintain merchandising integrity unlike conventional designs in which the pot can rotate 360, thus hiding pertinent product information at point of sale or requiring multiple pot labels, thereby increasing costs.

Figure 22:
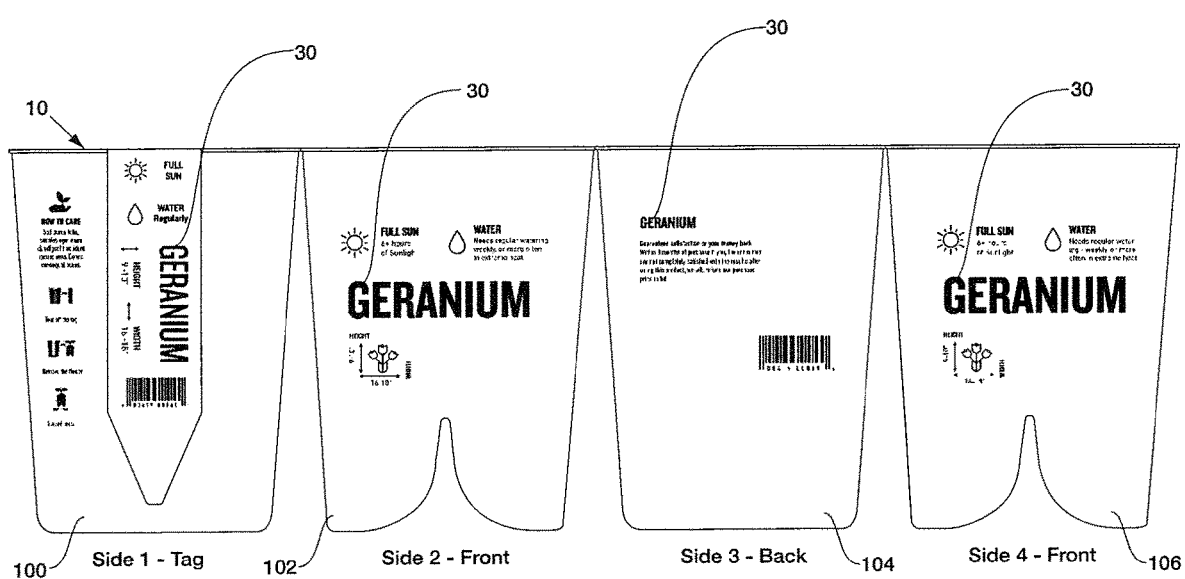
FIG. 22 shows branding on the tear off tab on side 1, side 2, side 3 and side 4 for example to identify the flower in the flower pot.

FIG. 22 shows branding on tear off tab 30 on side 1 (100), side 2 (102), side 3 (104) and side 4 (106) for example to identify the in pot 10.

Advantageously, the integrated tear-off tab permits faster, easier removal of plant from pot, preventing transplant shock often experienced by plants having been forcibly transplanted from conventional pot; and provides a much easier method for consumers to transplant. It is observed that plants better establish as a result of minimized transplant stress. Integrated tear-off tab eliminates costly manual tag-adding step in production and merchandising process, improving conventional production and merchandising efficiency, and can reduce sales operations costs Pots having an integrated tear-off tab facilitates simplified access to product information for training of retail persons and informing consumers.

In one embodiment, the integrated tear-off tab is comprised of solid material for convenient future reference for consumers, as consumers typically maintain plant tags for easy reference of optimal plant care and other plant information.

FIG. 23 shows an example of channel configuration in a funnel shape (110).

FIG. 24 shows an example of channel configuration in a U-shape (120).

FIG. 25 shows an example of channel configuration in a tulip-shape (130).

FIG. 26 shows a top view of a plurality of systems of the invention 58.

Advantageously, the overall channelled pot shape configurations can reduce soil volume needed for planting, reducing soil usage (for example, 15-21%% per pot over a conventional round 950 ml pots) and also improves airflow over conventional round and square pot shapes.

The channelled pot shape increases surface area around roots, eliminating need to tamper with roots when transplanting, a necessity when transplanting from conventional round and square pots, thus improving plant health. The channelled pot shape of the invention also enables optimum EC and Ph levels resulting in more efficient fertilizer uptake than conventional pots as well as presenting multiple merchandising options for point of sale unlike conventional round or square pot designs which must be affixed to a flat surface for display.

Figure 27:
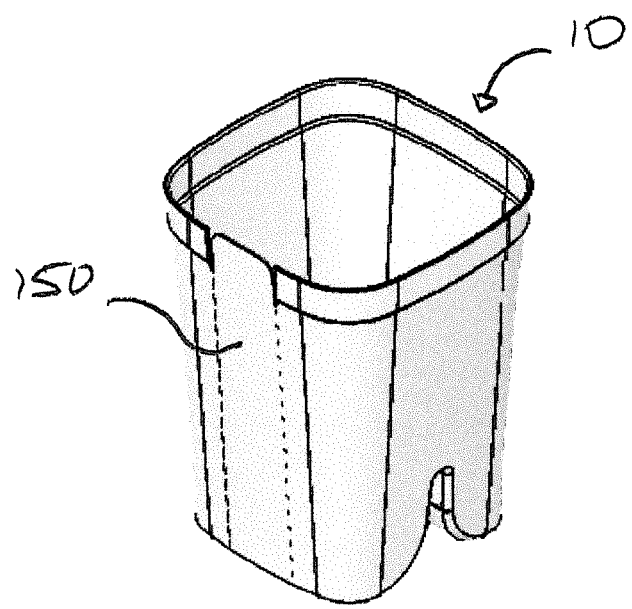
FIG. 27 shows a second embodiment of the tear-off tab with small grooves on either side of the tear-off tag to facilitate removal.

FIG. 27 shows a second embodiment of the tear-off tag with small grooves on either side of the tear-off tag to facilitate removal.

Accordingly, the present invention has been described with some degree of particularity directed to the exemplary embodiments. It should be appreciated, though, that the present invention is defined by the following claims construed in light of the prior art so that modifications or changes may be made to the exemplary embodiments that depart from the inventive concepts contained herein.

The invention claimed is:

1. A flower pot comprising: an upper part; a middle part connected at one end to the upper part; and a bottom part connected to an opposite end of the middle part; the bottom part having a channel extending from one side of the bottom part to the other side of the bottom part; said channel having a plurality of slots on its apex for receiving teeth to hold the pot in position on a horizontal rail associated to a tray and prevent the pot from sliding along the rail, and wherein the height of said channel is about ⅓ of the height of said pot.

2. A flower pot according to claim 1, having an integrated tear-off tab to facilitate easier removal of a flower from the pot.

3. A flower pot according to claim 1, wherein the channel has a shape selected from a U-shape, a funnel-shape and a tulip-shape.

4. A tray and rail for engaging in the channel of the flower pot according to claim 1, wherein said rail comprises a plurality of teeth are engaged in the slots to hold the flower pot in position on the rail.

5. An arrangement for displaying a flower comprising a flower pot according to claim 1 and an integrated tear-off tab according to claim 2.

* * * * *